UNITED STATES PATENT OFFICE.

ANTONIN BLACHON AND JEAN PERETMÈRE, OF PARIS, FRANCE.

PROCESS FOR CHEMICALLY RETTING AND UNGUMMING OF ALL TEXTILE PLANTS.

No. 905,639.           Specification of Letters Patent.           Patented Dec. 1, 1908.

Application filed July 2, 1907. Serial No. 381,942.

*To all whom it may concern:*

Be it known that we, ANTONIN BLACHON and JEAN PERETMÈRE, chemists, citizens of France, residing at 61 Rue Hallé, Paris, France, have invented new and useful Improvements in Processes for Chemically Retting and Ungumming Textile Plants, of which the following is a specification.

This invention relates to a process of chemical retting consisting in the use of a special bath dissolving the vegetable incrusting substances without touching the cellulose. The advantage of this process is that it can be applied nearly without hand labor under the atmospheric pressure and at a simple boiling temperature, thus avoiding the use of expensive digesters and allowing the treatment of great quantities at a time. The work is consequently effected in the open air by means of an open boiler the capacity of which corresponds to the volume of the textile plants to be retted. Besides all the plants can be treated either dried or undried, avoiding thus the oiling for the jute.

The details of an operation will be described hereinafter, but it will be understood that the proportions of the substances and the duration of the treatment are only given by way of example.

To charge a bath, the boiler is first filled up to the three quarters of its volume with a lye of soda at 12 degrees Baumé, say about 7 to 8 per cent. of real soda. The bath is then made to boil and the following products are added for 100 liters of liquid: common sea salt, 2 kgr. 500, purified potassium-chlorid, 2 kgr. 500, hypochlorid of soda at 20 chlorometric degrees, about 2 kgr. 500. This mixture is stirred rapidly, the textile plant is introduced therein, and the whole is kept boiling softly up to the end of the treatment.

With a fresh bath, the duration of the treatment varies as follows according to the plant treated: 30 to 50 minutes for flax which is already retted or an hour for straw flax dried or undried. 1 hour for hemp. 2 hours for alfa. 2½ hours for china root and for jute in thongs. 3 hours for rough thongs of bohmeria, and besides for these substances 20 to 30 minutes of stay in a second bath having the same composition as the first, which makes in this case a total duration of about 3½ hours. The bohmeria pellicles are then completely dissolved or disaggregated in such a manner that they detach themselves during the second stay in the bath.

The baths which have served to ungum the textile plants slightly impregnated with gum, such as flax, hemp, china root, may be regenerated by adding a third of a fresh bath. The baths more impure which have served for the treatment of thongs of jute or of bohmeria must be regenerated by adding a half of a fresh bath. As to the baths of a second stay, they may serve several times without being modified.

Having now particularly described our invention, what we claim as new and desire to secure by Letters Patent is:

A process for chemically removing the pellicles from bohmeria and for retting and ungumming all textile plants in a single bath, consisting in treating said plants in a bath kept boiling and formed by adding into a lye of soda common sea-salt, purified potassium-chlorid and hypochlorid of soda, substantially as described and for the purpose set forth.

In testimony whereof we have signed our names to this specification in the presence of two subscribing witnesses.

ANTONIN BLACHON.
JEAN PERETMÈRE.

Witnesses:
  ANTOINE LARSIR,
  DEAN B. MASON.